United States Patent
Guizilini et al.

(10) Patent No.: US 11,868,439 B2
(45) Date of Patent: Jan. 9, 2024

(54) MIXED-BATCH TRAINING OF A MULTI-TASK NETWORK

(71) Applicant: Toyota Research Institute, Inc., Los Altos, CA (US)

(72) Inventors: Vitor Guizilini, Santa Clara, CA (US); Adrien David Gaidon, Mountain View, CA (US); Jie Li, Los Altos, CA (US); Rares A. Ambrus, San Francisco, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 60 days.

(21) Appl. No.: 17/215,646

(22) Filed: Mar. 29, 2021

(65) Prior Publication Data

US 2022/0156525 A1 May 19, 2022

Related U.S. Application Data (60) Provisional application No. 63/113,477, filed on Nov. 13, 2020.

(51) Int. Cl.
*G06F 18/21* (2023.01)
*G06T 9/00* (2006.01)
(Continued)

(52) U.S. Cl.
CPC ...... *G06F 18/2178* (2023.01); *G06F 18/2148* (2023.01); *G06T 7/50* (2017.01);
(Continued)

(58) Field of Classification Search
CPC ... G06F 18/2178; G06F 18/2148; G06T 7/50; G06T 7/74; G06T 9/002; G06T 2207/10024; G06T 2207/10028; G06T 2207/20081; G06T 2207/20084; G06V 20/56; G06V 20/64; G06V 10/82;
(Continued)

(56) References Cited

U.S. PATENT DOCUMENTS

2016/0350930 A1 12/2016 Lin et al.
2019/0080206 A1 3/2019 Hotson et al.
(Continued)

OTHER PUBLICATIONS

Predicting Depth, Surf Normals and Sem Labels, Eigen et al., 2015; https://arxiv.org/pdf/1411.4734.pdf (Year: 2015).*
(Continued)

*Primary Examiner* — Jianxun Yang
(74) *Attorney, Agent, or Firm* — Christopher G. Darrow; Darrow Mustafa PC (57) ABSTRACT

Systems, methods, and other embodiments described herein relate to training a multi-task network using real and virtual data. In one embodiment, a method includes acquiring training data that includes real data and virtual data for training a multi-task network that performs at least depth prediction and semantic segmentation. The method includes generating a first output from the multi-task network using the real data and second output from the multi-task network using the virtual data. The method includes generating a mixed loss by analyzing the first output to produce a real loss and the second output to produce a virtual loss. The method includes updating the multi-task network using the mixed loss.

17 Claims, 5 Drawing Sheets

(51) Int. Cl.
G06V 20/56 (2022.01)
G06V 20/64 (2022.01)
G06T 7/73 (2017.01)
G06T 7/50 (2017.01)
G06F 18/214 (2023.01)

(52) U.S. Cl.
CPC ............. *G06T 7/74* (2017.01); *G06T 9/002* (2013.01); *G06V 20/56* (2022.01); *G06V 20/64* (2022.01); *G06T 2207/10024* (2013.01); *G06T 2207/10028* (2013.01); *G06T 2207/20081* (2013.01); *G06T 2207/20084* (2013.01)

(58) Field of Classification Search
CPC .............. G06N 3/045; G06N 3/084; G05D 2201/0213; G05D 1/0088; G05D 1/0221; G05D 1/0251
See application file for complete search history.

(56) References Cited

U.S. PATENT DOCUMENTS

| 2019/0147298 | A1 | 5/2019 | Rabinovich et al. | |
| 2019/0147582 | A1 | 5/2019 | Lee et al. | |
| 2019/0244107 | A1 | 8/2019 | Murez et al. | |
| 2020/0027002 | A1* | 1/2020 | Hickson | G06V 10/454 |
| 2020/0082541 | A1 | 3/2020 | Jouppi et al. | |
| 2021/0216828 | A1* | 7/2021 | Ramaiah | G06F 18/2178 |

OTHER PUBLICATIONS

Zou, et al. "Confidence Regularized Self-Training". In The IEEE International Conference on Computer Vision (ICCV), Oct. 2019.
Zou, et al. "Unsupervised Domain Adaptation for Semantic Segmentation Via Class-Balanced Self-Training". In Proceedings of the European conference on computer vision (ECCV), pp. 289-305, 2018.
Vu et al., "DADA: Depth-Aware Domain Adaptation in Semantic Segmentation". found at: arXiv:1904.01886v3 [cs.CV] Aug. 19, 2019.
Chen et al., "Learning Semantic Segmentation From Synthetic Data—A Geometrically Guided Input-Output Adaptation Approach". found at: https://openaccess.thecvf.com/content_CVPR_2019/papers/Chen_Learning_Semantic_Segmentation_From_Synthetic_Data_A_Geometrically_Guided_Input-Output_CVPR_2019_paper.pdf.
Zheng et al., "Unsupervised Scene Adaptation with Memory Regularization in vivo," found at: arXiv:1912.11164v2 [cs.CV] Jan. 26, 2020.
Watanabe et al. "Multichannel Semantic Segmentation with Unsupervised Domain Adaptation". found at: arXiv:1812.04351v1 [cs.CV] Dec. 11, 2018.
Lee et al. "SPIGAN Privileged Adversarial Learning from Simulation". found at: arXiv:1810.03756v3 [cs.CV] Feb. 18, 2019.
Cheng et al. "S3Net Semantic-Aware Self-supervised Depth Estimation with Monocular Videos and Synthetic Data". found at: arXiv:2007.14511v1 [cs.CV] Jul. 28, 2020.
Mendes et al., "On Deep Learning Techniques to Boost Monocular Depth Estimation for Autonomous Navigation". found at: arXiv:2010.06626v1 [cs.CV] Oct. 13, 2020.
Mousavian et al., "Joint Semantic Segmentation and Depth Estimation with Deep Convolutional Networks". found at: arXiv:1604.07480v3 [cs.CV] Sep. 19, 2016.
Bousmalis et al., "Unsupervised pixellevel domain adaptation with generative adversarial networks". found at: arXiv:1612.05424v2 [cs.CV] Aug. 23, 2017.
Zhou et al., "Unsupervised Learning of Depth and Ego-Motion from Video". found at: arXiv:1704.07813v2 [cs.CV] Aug. 1, 2017.
Zhou et al., "Stereo Magnification: Learning view synthesis using multiplane images". found at: arXiv:1805.09817v1 [cs.CV] May 24, 2018.
Ganin et al., "Domain-Adversarial Training of Neural Networks". fJMLR, 17(1):2096-2030, Jan. 2016.
Hur et al., "Self-Supervised Monocular Scene Flow Estimation". In CVPR, 2020.
Jin et al., "Unsupervised Hard Example Mining from Videos for Improved Object Detection". . . In European Conference on Computer Vision (ECCV), 2018.
Peng et al., "Learning Deep Object Detectors from 3D Models". found at: arXiv:1412.7122v4 [cs.CV] Oct. 12, 2015.
Tzeng et al., "Deep Domain Confusion: Maximizing for Domain Invariance". found at: arXiv:1412.3474v1 [cs.CV] Dec. 10, 2014.
Valada et al., "Self-Supervised Model Adaptation for Multimodal Semantic Segmentation". found at: arXiv:1808.03833v3 [cs.CV] Jul. 8, 2019.
Yan et al. "Learning Domain-Invariant Subspace using Domain Features and Independence Maximization". found at: arXiv:1603.04535v2 [cs.CV] Jun. 22, 2017.
Volpi et al., "Adversarial Feature Augmentation for Unsupervised Domain Adaptation". found at: arXiv:1711.08561v2 [cs.CV] May 4, 2018.
Flynn et al., "DeepStereo: Learning to Predict New Views from the World's Imagery". found at: arXiv:1506.06825v1 [cs.CV] Jun. 22, 2015.
de Souza et al., "Generating Human Action Videos by Coupling 3D Game Engines and Probabilistic Graphical Models". found at: arXiv:1910.06699v1 [cs.CV] Oct. 12, 2019.
Zhou, et al., "Learning Dense Correspondence via 3D-guided Cycle Consistency". In Proceedings of the IEEE Conference on Computer Vision and Pattern Recognition, pp. 117-126, 2016.
Alhaija, et al., "Augmented Reality Meets Computer Vision: Efficient Data Generation for Urban Driving Scenes". International Journal of Computer Vision (IJCV), 2018, arXiv:1708.01566v1 [cs.CV] Aug. 4, 2017.
Cabon, et al., "Virtual Kitti 2". found at: arXiv:2001.10773v1 [cs.CV] Jan. 29, 2020.
Carlucci, et al., "Domain Generalization by Solving Jigsaw Puzzles". In Proceedings of the IEEE Conference on Computer Vision and Pattern Recognition, pp. 2229-2238, 2019.
Cordts, et al., "The Cityscapes Dataset for Semantic Urban Scene Understanding". In IEEE conference on computer vision and pattern recognition, pp. 3213-3223, 2016.
Deng, et al., "ImageNet: A Large-Scale Hierarchical Image Database". In Proceedings of the IEEE Conference on Computer Vision and Pattern Recognition, 2009.
Eigen, et al., "Predicting Depth, Surface Normals and Semantic Labels with a Common Multi-Scale Convolutional Architecture". In 2015 IEEE International Conference on Computer Vision (ICCV), pp. 2650-2658, 2015.
Eigen, et al., "Depth Map Prediction from a Single Image using a Multi-Scale Deep Network". In Advances in neural information processing systems, pp. 2366-2374, 2014, arXiv:1406.2283v1 [cs.CV] Jun. 9, 2014.
Gaidon, et al., "Virtual Worlds as Proxy for Multi-Object Tracking Analysis". In Proceedings of the IEEE conference on computer vision and pattern recognition, pp. 4340-4349, 2016.
Garg, et al., "Unsupervised CNN for Single View Depth Estimation: Geometry to the Rescue". In European Conference on Computer Vision, pp. 740-756. Springer, 2016, arXiv:1603.04992v2 [cs.CV] Jul. 29, 2016.
Geiger, et al., "Vision meets robotics: The KITTI dataset". The International Journal of Robotics Research, 32(11):1231-1237, 2013.
Geiger, et al., "Are We Ready for Autonomous Driving? The KITTI Vision Benchmark Suite". In Conference on Computer Vision and Pattern Recognition (CVPR), 2012.
Ghifary, et al., "Deep Reconstruction-Classification Networks for Unsupervised Domain Adaptation". In European Conference on Computer Vision, pp. 597-613. Springer, 2016, arXiv:1607.03516v2 [cs.CV] Aug. 1, 2016.

(56) References Cited

OTHER PUBLICATIONS

Gidaris, et al., "Unsupervised Representation Learning by Predicting Image Rotations". found at: arXiv preprint arXiv:1803.07728, 2018, arXiv:1803.07728v1 [cs.CV] Mar. 21, 2018.

Godard, et al., "Unsupervised Monocular Depth Estimation with Left-Right Consistency." In CVPR, vol. 2, p. 7, 2017.

Godard, et al., "Digging into self-supervised monocular depth prediction". In Proceedings of the IEEE/CVF International Conference on Computer Vision (ICCV), 2019, pp. 3828-3838.

Gordon, et al., "Depth from Videos in the Wild: Unsupervised Monocular Depth Learning from Unknown Cameras." In Proceedings of the IEEE International Conference on Computer Vision, pp. 8977-8986, 2019.

Guizilini, et al., "3D Packing for Self-Supervised Monocular Depth Estimation". In International Conference on Computer Vision and Pattern Recognition (CVPR), 2020.

Guizilini, et al., "Semantically-Guided Representation Learning for Self-Supervised Monocular Depth", arXiv preprint arXiv:2002.12319, 2020, arXiv:2002.12319v1 [cs.CV] Feb. 27, 2020.

He, et al., "Deep Residual Learning for Image Recognition". In Proceedings of the IEEE conference on computer vision and pattern recognition, pp. 770-778, 2016.

Hoffman, et al., "CyCADA: Cycle-Consistent Adversarial Domain Adaptation". In International conference on machine learning, pp. 1989-1998. PMLR, 2018.

Mei, et al., "Instance Adaptive Self-Training for Unsupervised Domain Adaptation". In European Conference on Computer Vision (ECCV), 2020, arXiv:2008.12197v1 [cs.CV] Aug. 27, 2020.

Larsson et al., "Learning representations for automatic colorization". found at: arXiv:1603.06668v2 [cs.CV] Jul. 28, 2016.

Lee, et al., "From Big to Small: Multi-Scale Local Planar Guidance for Monocular Depth Estimation". found at: aarXiv:1907.10326v5 [cs.CV] Mar. 6, 2020.

Li, et al., "Content-Consistent Matching for Domain Adaptive Semantic Segmentation". In European Conference on Computer Vision (ECCV), 2020.

Loshchilov, et al., "Decoupled Weight Decay Regularization". In International Conference on Learning Representations, 2019, arXiv:1711.05101v3 [cs.LG] Jan. 4, 2019.

Luo, et al., "Taking A Closer Look at Domain Shift: Category-level Adversaries for Semantics Consistent Domain Adaptation". In The IEEE Conference on Computer Vision and Pattern Recognition (CVPR), 2019.

Misra, et al., "Cross-stitch Networks for Multi-task Learning." In 2016 IEEE Conference on Computer Vision and Pattern Recognition (CVPR), pp. 3994-4003, 2016.

Noroozi. et al., "Unsupervised Learning of Visual Representations by Solving Jigsaw Puzzles". lound at arXiv:1603.09246v3 [cs.CV] Aug. 22, 2017.

Paszke et al., "Automatic differentiation in pytorch". In NIPS-W, 2017.

Patel et al. "Visual domain adaptation: A survey of recent advances". IEEE signal processing magazine, 32(3):53-69, 2015.

Pohlen, et al., "Full-Resolution Residual Networks for Semantic Segmentation in Street Scenes". In Proceedings of the IEEE Conference on Computer Vision and Pattern Recognition, pp. 4151-4160, 2017.

Richter, et al., "Playing for Data: Ground Truth from Computer Games". In European conference on computer vision, pp. 102-118. Springer, 2016, arXiv:1608.02192v1 [cs.CV] Aug. 7, 2016.

Ros, et al., "The SYNTHIA Dataset: A Large Collection of Synthetic Images for Semantic Segmentation of Urban Scenes". In Proceedings of the IEEE conference on computer vision and pattern recognition, pp. 3234-3243, 2016.

RoyChowdhury, et al., "Automatic Adaptation of Object Detectors to New Domains Using Self-Training". In IEEE Conference on Computer Vision and Pattern Recognition (CVPR), 2019.

Shu, et al., "Feature-metric Loss for Self-supervised Learning of Depth and Egomotion". In ECCV, 2020, arXiv:2007.10603v1 [cs.CV] Jul. 21, 2020.

Subhani, et al., "Learning from Scale-Invariant Examples for Domain Adaptation in Semantic Segmentation". In European Conference on Computer Vision (ECCV), 2020, arXiv:2007.14449v1 [cs.CV] Jul. 28, 2020.

Sun, et al., "Unsupervised Domain Adaptation Through Self-Supervision". found at: arXiv preprint arXiv:1909.11825, 2019, arXiv:1909.11825v2 [cs.LG] Sep. 29, 2019.

Tsai, et al., "Domain Adaptation for Structured Output via Discriminative Patch Representations". In IEEE International Conference on Computer Vision (ICCV), 2019.

Vasiljevic, et al., "Neural Ray Surfaces for Self-Supervised Learning of Depth and Ego-motion". found at: arXiv:2008.06630v1 [cs.CV] Aug. 15, 2020.

Vu, et al., "ADVENT: Adversarial Entropy Minimization for Domain Adaptation in Semantic Segmentation." In CVPR, 2019.

Wang, et al., "Deep Visual Domain Adaptation: A Survey". found at: arXiv:1802.03601v4 [cs.CV] May 25, 2018.

Wang, et al., "Image Quality Assessment: From Error Visibility to Structural Similarity". IEEE transactions on image processing, 13(4):600-612, 2004.

Wilson, et al., "A Survey of Unsupervised Deep Domain Adaptation. ACM Transactions on Intelligent Systems and Technology (TIST)". found at: arXiv:1812.02849v3 [cs.LG] Feb. 6, 2020.

Wu, et al., "DCAN: Dual Channel-wise Alignment Networks for Unsupervised Scene Adaptation." In Proceedings of the European Conference on Computer Vision (ECCV), pp. 518-534, 2018.

Wu, et al., "Bridging Category-level and Instance-level Semantic Image Segmentation". found at: arXiv preprint arXiv:1605.06885, 2016, arXiv:1605.06885v1 [cs.CV] May 23, 2016.

Xu, et al., "Self-Supervised Domain Adaptation for Computer Vision Tasks". IEEE Access, 7:156694-156706, 2019.

Yang, et al., "FDA: Fourier Domain Adaptation for Semantic Segmentation". In Proceedings of the IEEE/CVF Conference on Computer Vision and Pattern Recognition (CVPR), Jun. 2020.

Zhao et al., "Loss functions for image restoration with neural networks". found at: arXiv:1511.08861v3 [cs.CV] Apr. 20, 2018.

Zhou, et al., "Unsupervised Learning of Depth and Ego-Motion from Video." In CVPR, vol. 2, p. 7, 2017.

\* cited by examiner

MIXED-BATCH TRAINING OF A MULTI-TASK NETWORK

CROSS-REFERENCE TO RELATED APPLICATIONS

This application claims benefit of U.S. Provisional Application No. 63/113,477, filed on, Nov. 13, 2020, which are herein incorporated by reference in their entirety.

TECHNICAL FIELD

The subject matter described herein relates, in general, to systems and methods for training a neural network that performs multiple different tasks, and, more particularly, to a unique training procedure that uses both virtual and real data as a mixed-batch.

BACKGROUND

Devices that operate autonomously or that provide information about a surrounding environment often use sensors that facilitate perceiving aspects of the surrounding environment. As one example, a robotic device uses information from the sensors to develop awareness to facilitate navigating through the environment and avoiding hazards. The ability to perceive distances and additional aspects of identified objects using sensor data provides the robotic device with the ability to plan movements through the environment and generally improve situational awareness about the environment.

In one approach, the robotic device may employ monocular cameras to capture images of the surrounding environment. While this approach can avoid the use of expensive light detection and ranging (LiDAR) sensors, the captured images do not explicitly include information, such as depth. Instead, the robotic device can implement processing routines that derive depth and other information from the monocular images. However, training a multi-task network to produce accurate information remains a complex task. For example, in general, training on a single task may include acquiring a multiplicity of training data, such as monocular video. Thus, training on multiple tasks, such as depth prediction and semantic segmentation, uses even more information. This can be even further complicated by the use of real images, which include intrinsic sources of data for self-supervision, but would necessitate manual annotation for facilitating the additional tasks. Consequently, difficulties persist with training a multi-task network in a reliable manner.

SUMMARY

In one embodiment, example systems and methods relate to a novel approach to training a multi-task network using mixed batches of real and virtual data. As previously noted, training multi-task networks and training neural networks in general can suffer from difficulties with acquiring acceptable training data. Moreover, these difficulties can be exacerbated depending on the particular task of the network, e.g., semantics, depth, etc. That is, certain types of ground-truth data can be more difficult to acquire since a particular type of data (e.g., semantic labels) may rely on manual labeling as opposed to automated sources (e.g., additional sensor modalities acquire in parallel). In any case, the process of acquiring the labeled training data for supervised training can prove to be impractical, thereby limiting the ability to effectively train a network. Moreover, while virtual data can intrinsically include the ground-truth information, training solely on virtual data generally does not provide the same level of training as achieved with real data (e.g., real images versus synthetic images).

Therefore, in one arrangement, a training approach is disclosed that leverages both real and virtual data to provide improved training for a multi-task network that performs at least semantic segmentation and depth prediction from monocular images. For example, in at least one arrangement, the training includes using batches of training data that include real data and virtual data. The real data generally includes pairs of monocular images from a video while the virtual data may include synthetic images with ground-truth labels for depth and semantics. Accordingly, the multi-task network separately executes over the real data and the virtual data to generate separate outputs. The separate outputs form the basis of a real loss and a virtual loss. The real loss may be a self-supervised loss while the virtual loss may include multiple different losses, including a supervised semantic loss, depth loss, and so on. In any case, the real loss and the virtual loss combine to form a mixed loss from which the system updates at least an encoder of the multi-task network. In this way, the system can use both real and virtual data to train the multi-task network while avoiding difficulties associated with acquiring labeled training data.

In one embodiment, a perception system is disclosed. The depth system includes one or more processors and a memory communicably coupled to the one or more processors. The memory stores a network module including instructions that, when executed by the one or more processors, cause the one or more processors to acquire training data that includes real data and virtual data for training a multi-task network that performs at least depth prediction and semantic segmentation. The network module includes instructions to generate a first output from the multi-task network using the real data and second output from the multi-task network using the virtual data. The network module includes instructions to generate a mixed loss by analyzing the first output to produce a real loss and the second output to produce a virtual loss. The network module includes instructions to update the multi-task network using the mixed loss.

In one embodiment, a non-transitory computer-readable medium including instructions that when executed by one or more processors cause the one or more processors to perform various functions is disclosed. The instructions include instructions to acquire training data that includes real data and virtual data for training a multi-task network that performs at least depth prediction and semantic segmentation. The instructions include instructions to generate a first output from the multi-task network using the real data and second output from the multi-task network using the virtual data. The instructions include instructions to generate a mixed loss by analyzing the first output to produce a real loss and the second output to produce a virtual loss. The instructions include instructions to update the multi-task network using the mixed loss.

In one embodiment, a method is disclosed. The method includes acquiring training data that includes real data and virtual data for training a multi-task network that performs at least depth prediction and semantic segmentation. The method includes generating a first output from the multi-task network using the real data and second output from the multi-task network using the virtual data. The method includes generating a mixed loss by analyzing the first output to produce a real loss and the second output to produce a virtual loss. The method includes updating the multi-task network using the mixed loss.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with a novel approach to training a multi-task network using mixed batches of real and virtual data are disclosed. As previously noted, training multi-task networks and training neural networks in general can suffer from difficulties with acquiring acceptable training data. Moreover, these difficulties can be exacerbated depending on the particular task of the network, e.g., semantics, depth, etc. That is, certain types of ground-truth data can be more difficult to acquire since a particular type of data (e.g., semantic labels) may rely on manual labeling as opposed to automated sources (e.g., additional sensor modalities acquire in parallel). In any case, the process of acquiring the labeled training data for supervised training can prove to be impractical, thereby limiting the ability to effectively train a network. While virtual data can intrinsically include the ground-truth information, training solely on virtual data generally does not provide the same level of training as achieved with real data (e.g., real images versus synthetic images). For example, when training on virtual data achieving an effective level of training may involve implementing adversarial networks to facilitate the training or other mechanisms that further refine the training process, which can be cumbersome.

Therefore, in one arrangement, a training approach is disclosed that leverages both real and virtual data to provide improved training for a multi-task network that performs at least semantic segmentation and depth prediction using monocular images. For example, in at least one arrangement, the training includes using batches of training data that include real data and virtual data. The real data generally includes pairs of monocular images from a video while the virtual data may include synthetic images with ground-truth labels for depth and semantics. In further aspects, the virtual data may include further labels to facilitate additional determinations of supervised losses. Accordingly, the multi-task network separately executes over the real data and the virtual data to generate respective outputs. The outputs form the basis of a real loss and a virtual loss. The real loss may be a self-supervised loss while the virtual loss may include multiple different losses, including a supervised semantic loss, a supervised depth loss, and so on. In any case, the real loss and the virtual loss combine to form a mixed loss from which the system updates at least an image encoder of the multi-task network to perform an iteration of the training. In this way, the system can use both real and virtual data to train the multi-task network while avoiding difficulties associated with acquiring labeled training data.

Figure 1:
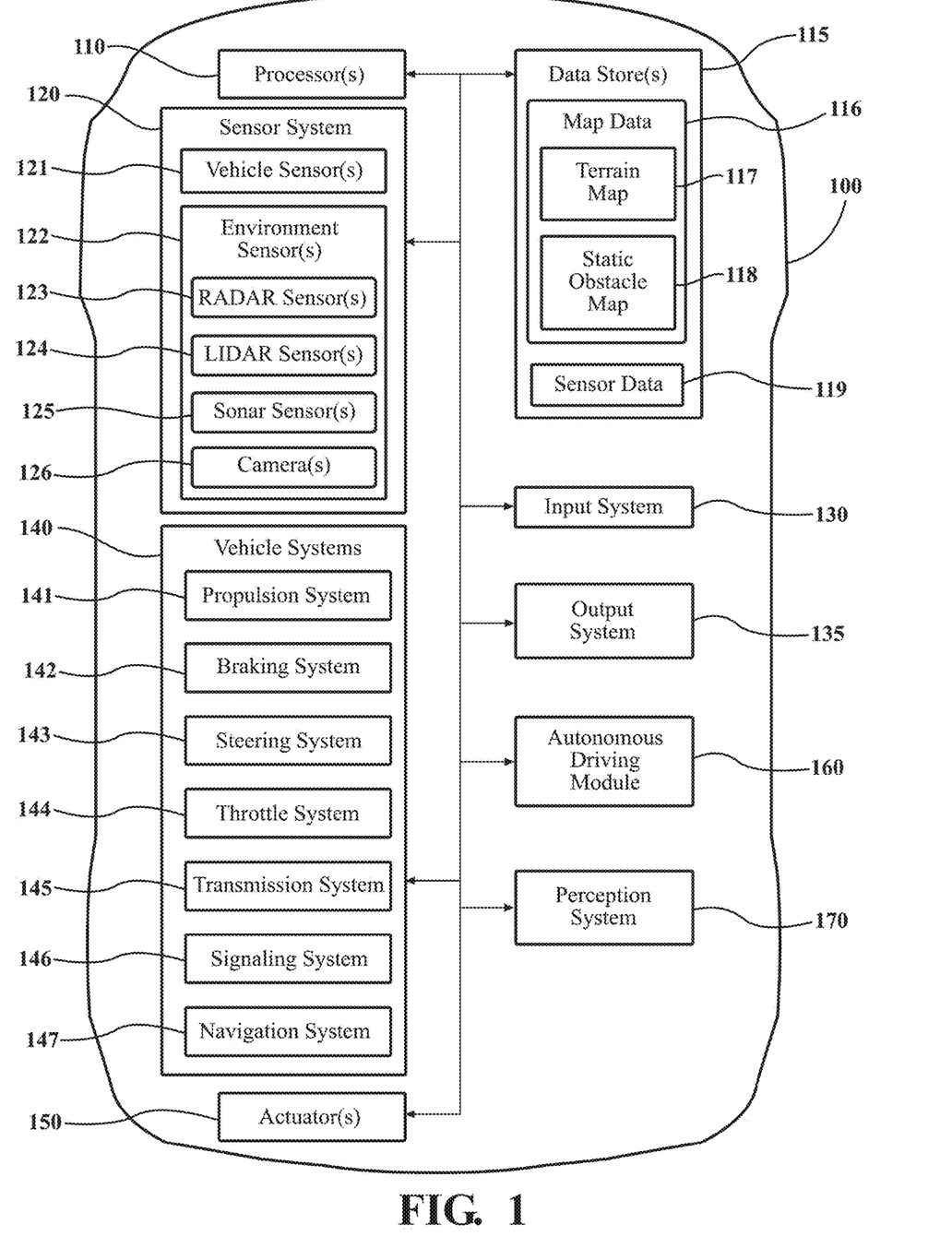
FIG. 1 illustrates one embodiment of a vehicle within which systems and methods disclosed herein may be implemented.

Referring to FIG. 1, an example of a vehicle 100 is illustrated. As used herein, a "vehicle" is any form of powered transport. In one or more implementations, the vehicle 100 is an automobile. While arrangements will be described herein with respect to automobiles, it will be understood that embodiments are not limited to automobiles. In some implementations, the vehicle 100 may be any robotic device or form of powered transport that, for example, observes surroundings to provide determinations therefrom, and thus benefits from the functionality discussed herein. In yet further embodiments, the vehicle 100 may instead be a statically mounted device, an embedded device, or another device that uses monocular images to derive depth and other information about a scene instead of being a motive device.

In any case, the vehicle 100 also includes various elements. It will be understood that, in various embodiments, it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are illustrated as being located within the vehicle 100, it will be understood that one or more of these elements can be located external to the vehicle 100. Further, the elements shown may be physically separated by large distances and provided as remote services (e.g., cloud-computing services, software-as-a-service (SaaS), etc.).

Some of the possible elements of the vehicle 100 are shown in FIG. 1 and will be described along with subsequent figures. However, a description of many of the elements in FIG. 1 will be provided after the discussion of FIGS. 2-5 for purposes of the brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In any case, the vehicle 100 includes a perception system 170 that functions to generate depth estimates (i.e., depth maps), semantic maps, and other information using a multi-task network that is, for example, a multi-head neural network. Moreover, while depicted as a standalone component, in one or more embodiments, the perception system 170 is integrated with the autonomous driving module 160, the camera 126, or another component of the vehicle 100. Additionally, as noted previously, one or more components of the perception system 170 may be cloud-based elements that are remote from the vehicle 100. In yet further aspects, the perception system 170 may be implemented as a wholly cloud-based element or in another computing context. The noted functions and methods will become more apparent with a further discussion of the figures.

Figure 2:
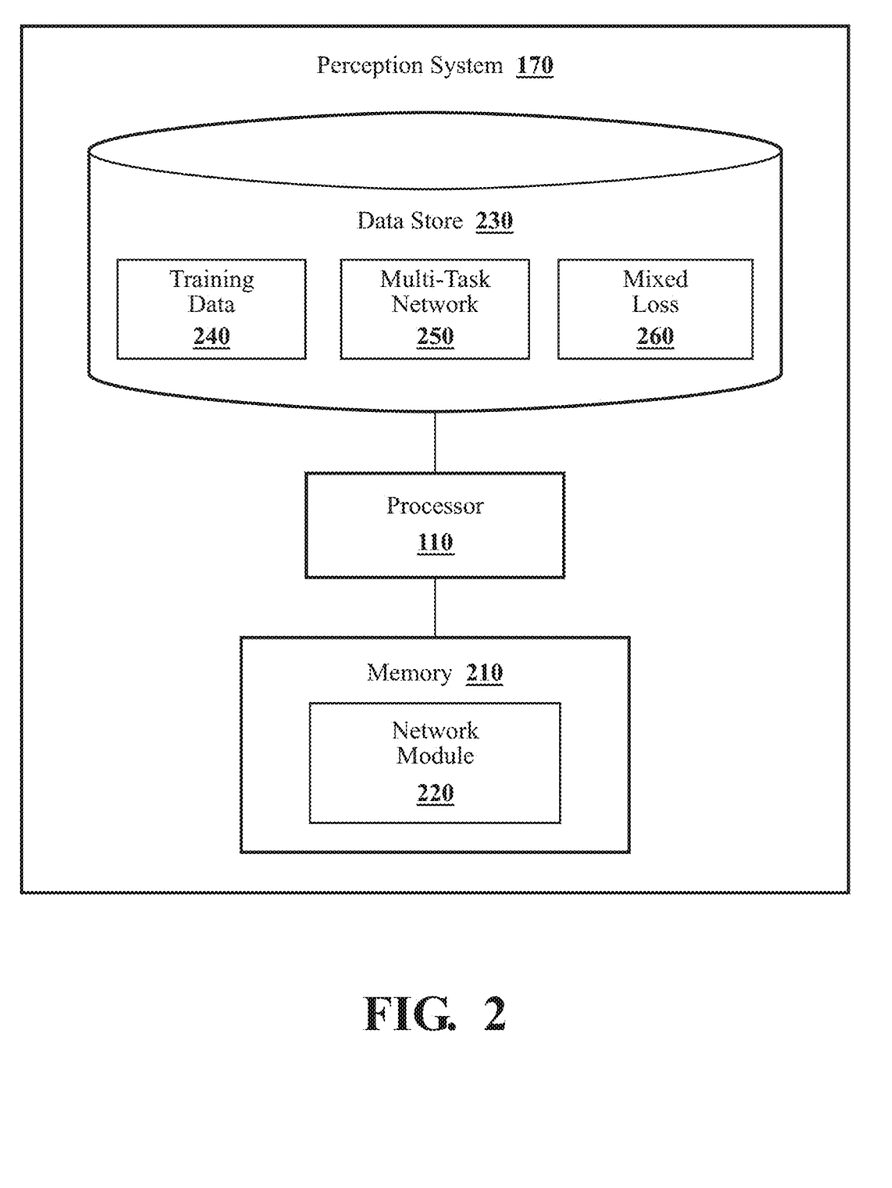
FIG. 2 illustrates one embodiment of a perception system that is associated with mixed-batch training of a multi-task network.

With reference to FIG. 2, one embodiment of the perception system 170 is further illustrated. The perception system 170 is shown as including a processor 110. Accordingly, the processor 110 may be a part of the perception system 170, or the perception system 170 may access the processor 110 through a data bus or another communication path. In one or more embodiments, the processor 110 is an application-specific integrated circuit (ASIC) that is configured to implement functions associated with a network module 220. In general, the processor 110 is an electronic processor, such as a microprocessor that is capable of performing various functions as described herein. In one configuration, the perception system 170 includes a memory 210 that stores the network module 220 and/or other modules that may function in support of generating information. The memory 210 is a random-access memory (RAM), read-only memory (ROM), a hard disk drive, a flash memory, or other suitable memory for storing the network module 220. The network module 220 is, for example, computer-readable instructions that, when executed by the processor 110, cause the processor 110 to perform the various functions disclosed herein. In further arrangements, the network module 220 is a logic circuit or combination of logic circuits, a module within the processor 110, a system-on-a-chip, or another hardware-based computing element.

Furthermore, in one embodiment, the perception system 170 includes a data store 230. The data store 230 is, in one embodiment, an electronic data structure stored in the memory 210 or another data store, and that is configured with routines that can be executed by the processor 110 for analyzing stored data, providing stored data, organizing stored data, and so on. Thus, in one arrangement, the data store 230 stores data used by the network module 220 in executing various functions. For example, as depicted in FIG. 2, the data store 230 includes training data 240, a multi-task network 250, and a mixed loss 260 along with, for example, other information that is used and/or produced by the network module 220, such as outputs of the multi-task network 250.

The training data 240 includes, for example, monocular images from the camera 126 or another imaging device. The monocular images are generally derived from one or more monocular videos that are comprised of a plurality of frames acquired while the camera is in motion. As described herein, monocular videos that comprise the monocular images are, for example, images from the camera 126 or another imaging device. The monocular images are part of a video, and encompass a field-of-view (FOV) about the vehicle 100 or location of the acquiring device of at least a portion of the surrounding environment. That is, a monocular image is, in one approach, generally limited to a subregion of the surrounding environment. As such, the image may be of a forward-facing (i.e., the direction of travel) 60, 90, 120-degree FOV, a rear/side facing FOV, or some other subregion as defined by the imaging characteristics (e.g., lens distortion, FOV, etc.) of the camera 126. In various aspects, the camera 126 is a pinhole camera, a fisheye camera, a catadioptric camera, or another form of camera that acquires images generally without a specific depth modality.

An individual monocular image itself includes visual data of the FOV that is encoded according to an imaging standard (e.g., codec) associated with the camera 126 or another imaging device that is the source. In general, characteristics of a source camera (e.g., camera 126) and the video standard define a format of the monocular image. Thus, while the particular characteristics can vary according to different implementations, in general, the image has a defined resolution (i.e., height and width in pixels) and format. Thus, for example, the monocular image is generally an RGB visible light image. In further aspects, the monocular image can be an infrared image associated with a corresponding infrared camera, a black/white image, or another suitable format as may be desired. Whichever format that the depth system 170 implements, the image is a monocular image in that there is no explicit additional modality indicating depth nor any explicit corresponding image from another camera from which the depth can be derived (i.e., no stereo camera pair). In contrast to a stereo image that may integrate left and right images from separate cameras mounted side-by-side to provide an additional depth channel, the monocular image does not include explicit depth information, such as disparity maps derived from comparing the stereo images pixel-by-pixel. Instead, the monocular image implicitly provides depth information in the relationships of perspective and size of elements depicted therein from which the multi-task network 250 derives a depth map, semantic map, and/or other information.

Moreover, monocular video(s) from which the monocular images are derived may include observations of many different scenes. That is, as the camera 126 or another original source camera of the video progresses through an environment, perspectives of objects and features in the environment change, and the depicted objects/features themselves also change, thereby depicting separate scenes (i.e., particular combinations of objects/features). Thus, the perception system 170 may extract particular training pairs of monocular images from the monocular video for training. In particular, the perception system 170, in at least one arrangement, generates the pairs from the video so that the pairs of images are of the same scene. As should be appreciated, the video includes a series of monocular images that are taken in succession according to a configuration of the camera. Thus, the camera may generate the images (also referred to herein as frames) of the video at regular intervals, such as every 0.033 s. That is, a shutter of the camera operates at a particular rate (i.e., frames-per-second (fps) configuration), which may be, for example, 24 fps, 30 fps, 60 fps, etc.

For purposes of the present discussion, the fps is presumed to be 30 fps. However, it should be appreciated that the fps may vary according to a particular configuration. Moreover, the perception system 170 need not generate the pairs from successive ones (i.e., adjacent) of images in a video, but instead can pair separate images of the same scene that are not successive as training images. Thus, in one approach, the perception system 170 pairs every other image depending on the fps. In a further approach, the perception system 170 pairs every fifth image as a training pair. The greater the timing difference in the video between the pairs, the more pronounced a difference in camera position; however, this may also result in fewer shared features/objects between the images. As such, as previously noted, the pairs of monocular images for training are of a same scene and are generally constrained, in one or more embodiments, to be within a defined number of frames (e.g., 5 or fewer) to ensure correspondence of an observed scene between a pair of the monocular images. In any case, the pairs of monocular images generally have attributes of being monocular images from a monocular video that are separated by some interval of time (e.g., 0.06 s) such that a perspective of the camera changes between the pair of training images as a result of motion of the camera through the environment while generating the video. Accordingly, as provided for herein, the pairs of images included within the training data 240 form the real data from which the perception system 170 generates a real loss as part of training the multi-task network 250.

Furthermore, the training data 240 also includes virtual data for training the multi-task network 250. The virtual data includes information that the multi-task network 250 processes and also includes ground-truth data. In particular, the virtual data is, in at least one arrangement, synthetic. That is, the virtual data is synthesized or, in other words, is computer generated. The virtual data may be partially or wholly synthetic. That is, the virtual data may be based on or include elements derived from real data but is otherwise computer generated such that aspects about the depicted scene are modeled and are thus known. For example, in one approach, the virtual data includes synthetic monocular images of various driving scenes. Because the synthetic image is computer generated, ground-truth data that identifies characteristics of elements depicted in the image is known since the information may be generated as the computer models the scene for producing the synthetic image. For example, synthetic images in the virtual data include at least ground-truth labels identifying semantic classes of elements depicted in the images, and depth labels for depths on a per-pixel basis. In further aspects, the virtual data may include additional explicit labels, yet it should be appreciated that ground-truth data is generally intrinsically available for aspects of the virtual data. As one example, the virtual data may further include camera intrinsics and pose in addition to the noted dense semantic labels and dense depth maps. Moreover, in a further aspect, the virtual data may mimic the real data by including, for example, pairs of synthetic images for training according to a self-supervised style (i.e., using two successive images along with a pose model to generate a self-supervised loss).

Continuing with FIG. 2, the multi-task network 250 is, in at least one arrangement, a neural network that is comprised of various encoders and decoders for performing the noted functions. The multi-task network 250 may include a shared image backbone that is a convolutional encoder (also referred to herein as an image encoder), which encodes image features from monocular images. The image encoder, in one arrangement, provides the image features to separate decoders associated with different tasks. Thus, the multi-task network 250 also includes, in one arrangement, a depth decoder and a semantic decoder. The depth decoder generates a depth map indicating depths within a depicted scene of a monocular image while the semantic decoder generates a semantic map indicating semantic classes of objects and surfaces depicted in the monocular image.

In one configuration, the multi-task network 250 has an encoder/decoder architecture that includes a shared backbone in the form of the image encoder and may have multiple heads in the form of the different decoders. In one approach, the image encoder accepts a monocular image from the training data 240 as an electronic input and processes the image to extract features therefrom. The features are, in general, aspects of the image that are indicative of spatial information, object information, and so on that the image intrinsically encodes. As such, encoding layers that form the encoder function to, in one approach, fold (i.e., adapt dimensions of the feature map to retain the features) encoded features into separate channels, iteratively reducing spatial dimensions of the image while packing additional channels with information about embedded states of the features. Thus, the addition of the extra channels avoids the lossy nature of the encoding process and facilitates the preservation of more information (e.g., feature details) about the original monocular image.

Accordingly, in one embodiment, the image encoder is comprised of multiple encoding layers formed from a combination of two-dimensional (2D) convolutional layers, packing blocks, and residual blocks. Moreover, the separate encoding layers generate outputs in the form of encoded feature maps (also referred to as tensors), which the encoding layers provide to subsequent layers. As such, the encoder includes a variety of separate layers that operate on the monocular image, and subsequently on derived/intermediate feature maps that convert the visual information of the monocular image into embedded state information in the form of encoded features of different channels. It should be appreciated that the image encoder may take different forms and may include additional structures not explicitly described herein, such as skip connections, pooling layers, and so on.

In relation to the task of depth prediction, a depth decoder unfolds (i.e., adapts dimensions of the tensor to extract the features) the previously encoded spatial information in order to derive a depth map according to learned correlations associated with the encoded features. That is, the depth decoder includes decoding layers that generally function to up-sample, through sub-pixel convolutions and other mechanisms, the previously encoded features into the depth map, which may be provided at different resolutions. In one embodiment, the decoding layers comprise unpacking blocks, two-dimensional convolutional layers, and inverse depth layers that function as output layers for different scales of the depth map. The depth map is, in one embodiment, a data structure corresponding to the input image that indicates distances/depths to objects/features represented therein. Additionally, in one embodiment, the depth map is a tensor with separate data values indicating depths for corresponding locations in the image on a per-pixel basis. In any case, it should be appreciated that the depth decoder, while describe as having a particular set of layers, may include features that are different from those described herein.

Furthermore, in relation to the task of semantic segmentation, a semantic decoder functions to decode the previously encoded spatial information to derive a semantic map. The semantic encoder includes various decoding layers that generally function to identify semantic features from the encoded information and correlate the semantic features with pixels associated with the original input image. As should be appreciated, a semantic decoder may include various different decoding layers, which may be similar to the depth decoder. Additionally, the multi-task network 250 may include additional processing structures, such as a pose network that accepts two monocular images and generates a rigid-body transformation indicating a transformation between the images. The rigid-body transformation may be defined using a six-dimensional vector that includes translation and rotation Euler angles. Additional aspects about the multi-task network 250 will be discussed in greater detail with reference to subsequent figures.

With additional reference to FIG. 2, the network module 220 generates the mixed loss 260 from a real loss and a virtual loss. Accordingly, consider the follow explanation of the combined functions of the network 250 and the derivation of the mixed loss.

The multi-task network 250 is comprised of networks for depth $f_D: I \rightarrow \hat{D}$, that takes an input image $I$ and predicts a depth map $\hat{D}$; semantic $f_S: I \to \hat{S}$ that takes the same input image I and outputs a predicted semantic map $\hat{S}$; and pose $f_T: \{I_a, I_b\} \to \hat{T}_a^b$, that takes a pair of images and generates a rigid-body transformation T between the two images. In at least one arrangement, the multi-task network 250 includes a depth network and a semantic network that share an image encoder $f_E: I \to \hat{F}$ such that $f_D: f_E(I) \to \hat{D}$ and $f_S: f_E(I) \to \hat{S}$ both networks decode latent image features $\hat{F}$ into respective tasks of depth and semantics. By sharing the same encoder, the multi-task network 250 enables the adaptation of semantic features from a virtual domain using depth and ego-motion losses calculated in the real domain. Because depth and semantic decoders share the same encoded image features, the adaptation from jointly training adapts the shared semantic features. Accordingly, the approach implemented by the perception system 170 improves over other approaches by avoiding additional translation networks for domain alignment due to the benefits of mixed-batch training. Moreover, by considering self-supervised losses from structure-from-motion (SfM) cues in the real domain, the perceptions system 170 is able to eliminate the use of real ground-truth data for semantic labels and depth labels as a source of supervision.

Instead, the perception system 170 employs a mixed-batch approach to training that includes using both real and virtual data to derive a mixed loss $\mathcal{L}$ as shown in Equation (1).

$$\mathcal{L} = \mathcal{L}_R + \lambda_V \mathcal{L}_V \tag{1}$$

where $\lambda_V$ is a coefficient used to balance the real loss and the virtual loss. Real samples are assumed to include unlabeled image sequences $\mathcal{J}_r$, in the form of the current frame $I_t$ and a temporal context $\{I_{t-s}, \ldots, I_{t+s}\}$. The temporal context may vary but is generally described herein as s=1, which results in $\mathcal{J}_t = \{I_{t-1}, I_t, I_{t+1}\}$. Thus, the real loss is described by Equation (2) and generally derives cues from geometric information within the image sequence.

$$\mathcal{L}_R = \mathcal{L}_P + \lambda_{PL} \mathcal{L}_{PL} \tag{2}$$

where $\mathcal{L}_P$ is the self-supervised photometric loss and $\mathcal{L}_{PL}$ is a pseudo-label loss with a weighted coefficient $\lambda_{PL}$ that is optional and may not be included. In regards to the self-supervised loss that is a photometric loss, the loss is formulated as a novel view synthesis in which the perception system 170 reconstructs a target image $I_t$ using information from a reference image $I_{t'}$ given a predicted map $\hat{D}_t$ and relative transformation $\hat{T}_t^{t'}$ between images as shown in Equation (3).

$$\hat{I}_t = I_{t'} \langle \pi(\hat{D}_t, \hat{T}_t^{t'}, K) \rangle$$

where $\pi$ is the projection operation determined by camera geometry and $\langle \rangle$ is the bilinear sampling operator that is locally sub-differentiable. To measure the reconstruction that forms the basis of the real loss, the perception system 170 implements a photometric loss with a structure similarity (SSIM) component and the L1 distance in pixel space, which may be weighted by $\alpha = 0.85$.

$$\mathcal{L}_P(I_t, \hat{I}_t) = \alpha \frac{1 - SSIM(I_t, \hat{I}_t)}{2} + (1-\alpha) \| I_t - \hat{I}_t \| \tag{4}$$

The perception system 170, in one approach, calculates the photometric loss of equation (4) for separate images $I_{t'} \in \mathcal{J}$ and averaged for all pixels between multiple scales after upsampling to a highest resolution. The perception system 170 may further refine the photometric mask using auto-masking and reprojection error to mitigate occlusions and dynamic objects captured in the images.

In regards to the virtual loss, the virtual data includes, in one arrangement, input images $I_t$ with corresponding dense annotations for all of the considered tasks, which include, for example, depth maps $D_t$ and semantic labels $S_t$. Where sequential data is available, the perception system 170 also assumes temporal context $\mathcal{J}_t = \{T_t^{t-1}, T_t^{t+1}\}$, and constant camera intrinsics K. The virtual loss is:

$$\mathcal{L}_V = \mathcal{L}_S + \mathcal{L}_D + \lambda_N \mathcal{L}_N + \lambda_{PP} \mathcal{L}_{PP} \tag{5}$$

Where $\mathcal{L}_S$ is a supervised semantic loss, $\mathcal{L}_D$ is a supervised depth loss, $\mathcal{L}_N$ is a surface normal regularization term, and $\mathcal{L}_{PP}$ is an optional partially-supervised photometric loss with weights $\lambda_N$ and $\lambda_{PP}$. Of course, in further arrangements, the virtual loss $\lambda_V$ may include different elements than those discussed (e.g., fewer). In any case, the semantic loss $\lambda_S$ uses a bootstrapped cross-entropy loss between predicted semantic labels $\hat{S}$ and ground-truth labels S.

$$\mathcal{L}_S = -\frac{1}{K} \sum_{u=1}^{H} \sum_{v=1}^{W} \sum_{c=1}^{C} \mathbb{1}_{[c=y_{u,v}, p_{u,v}^c < t]} \log(p_{u,v}^c) \tag{6}$$

Where $p_{u,v}^c$ denotes the predicted probability of a pixel (u,v) belonging to a class c. t is a run-time threshold so that a worse performing K predictions are counted. In one approach, the perception system 170 adopts K=0.3×H×W.

In relation to the supervised depth loss for the virtual loss, the perception system 170 implements a scale-invariant logarithmic loss (SILog) that is formed by the sum of the variance and the weighted squared mean of the error in log space $\Delta d = \log d - \log \hat{d}$.

$$\mathcal{L}_D = \frac{1}{P} \sum_{d \in D} \Delta d^2 - \frac{\lambda}{P^2} \left( \sum_{d \in D} \Delta d \right)^2 \tag{7}$$

Where P is the number of pixels $d \in D$ with valid depth information. The coefficient $\lambda$ balances variance and error minimization, which the perception system 170 implements as $\lambda = 0.85$ in at least one approach. The perception system 170 enforces the surface normal regularization as a smoothness loss to maintain local consistency. In particular, the surface normal regularization leverages the dense depth supervision available in the virtual data and minimizes the vectors derived from ground-truth and predicted depth maps.

Furthermore, in one arrangement, the perception system 170 may also use a partially-supervised photometric loss that can be implemented when the virtual data includes sequences of synthetic images. The partially-supervised photometric loss is applicable to the depth and pose networks. To achieve this loss, the perception system 170 defines: $\hat{I}_t^D = I_{t'} \langle \pi(D_t, \hat{T}_t^{t'}, K) \rangle$ as $\hat{I}_t^T = I_{t'} \langle \pi(\hat{D}_t, T_t^{t'}, K) \rangle$ as the reconstructed target image obtained using predicted depth and ground-truth pose. Thus, the partially-supervised photometric loss is defined as:

$$\mathcal{L}_{PP} = \tfrac{1}{3}(\mathcal{L}_P(I_t, \hat{I}_t^T) + \mathcal{L}_P(I_t, \hat{I}_t^D) + \mathcal{L}_P^T(I_t, \hat{I}_t^D)) \tag{8}$$

As still a further aspect, the perception system 170 implements, in one or more configurations, a pseudo-label distillation loss that provides for improving domain adaptation (i.e., training on virtual data applied in the real domain). For example, the perception system 170 uses pseudo-labels as supervision in a target domain. Accordingly, using the predicted semantic map $\hat{S}$ from the real sample and a pseudo-label $S^{PL}$ that is pre-calculated from the same input image I as ground truth:

$$\mathcal{L}_{PL} = \mathcal{L}_S(\hat{S}, S^{PL}) \tag{9}$$

The combination of the pseudo-label loss with the self-supervised loss for the real loss value facilitates improved results from the multi-task network 250.

As further explanation of the mixed-batch training approach implemented by the perception system 170, the separate aspects of generating the real loss and generating the virtual loss will be discussed in reference to FIGS. 3 and 4.

Figure 3:
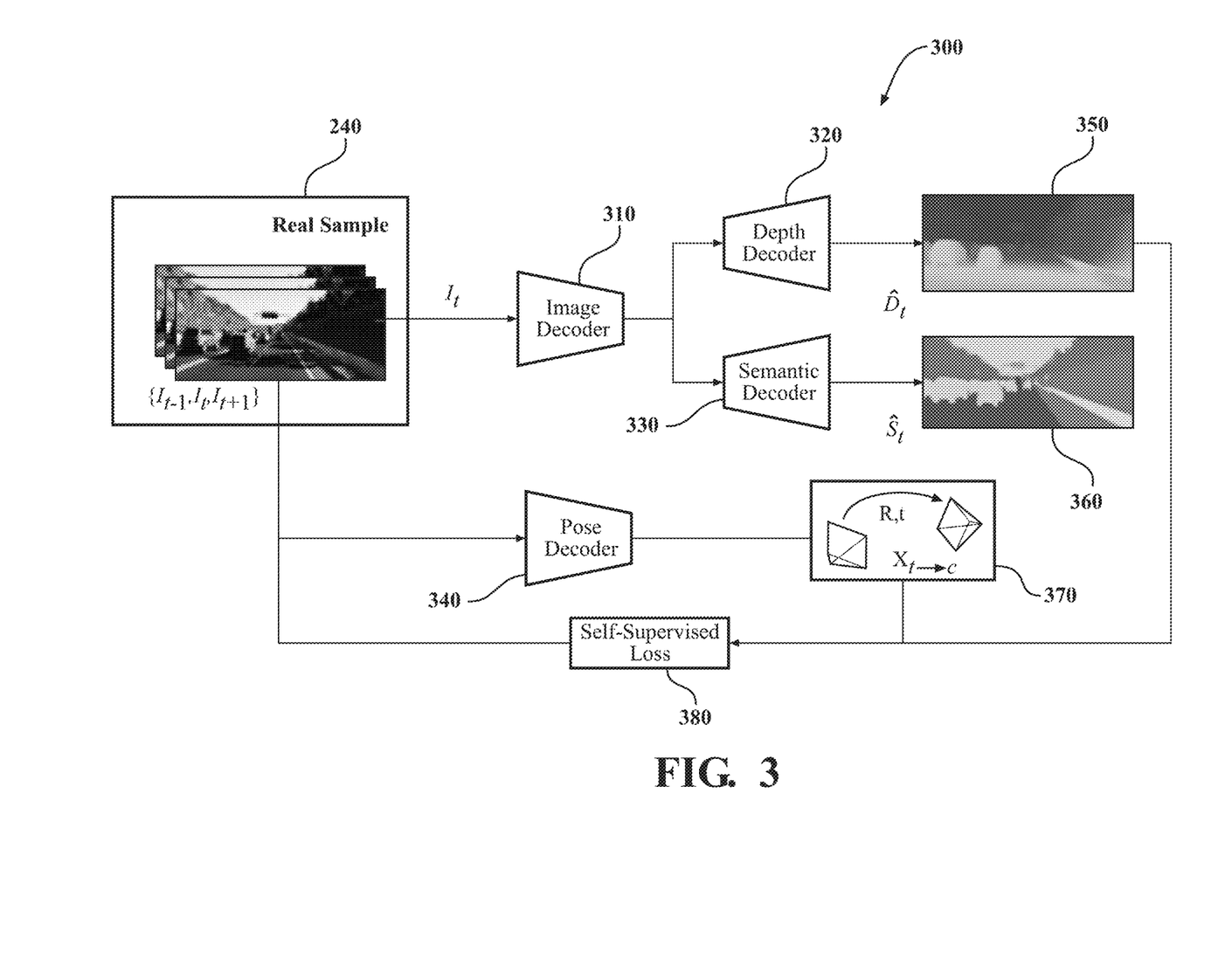
FIG. 3 illustrates a process of using a multi-task network with real data to generate a real loss.
Figure 4:
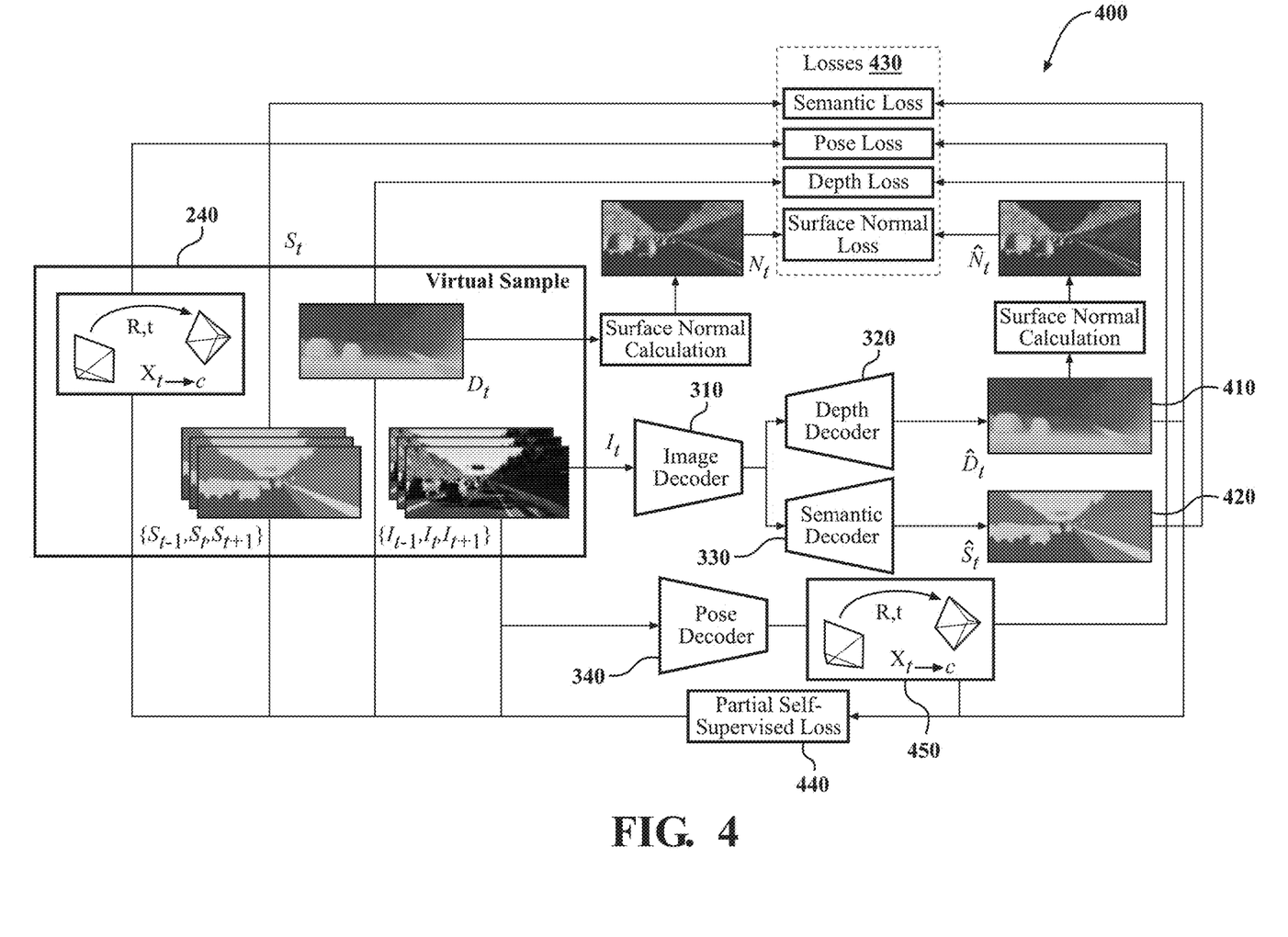
FIG. 4 illustrates a diagram for a process associated with generating a virtual loss using a multi-task network.

FIG. 3 illustrates components of the multi-task network 250 and a process 300 of generating the self-supervised loss according to equation (4) that forms at least part of the real loss. As shown in FIG. 3, the network 250 includes a shared image encoder 310, a depth decoder 320, a semantic decoder 330, and a pose encoder 340. The image encoder 310 and the pose encoder 340 accept real data from the training data 240. The image encoder generates a set of features that are fed into the depth decoder 320 and the semantic decoder 330. The decoders 320 and 330 separately generate a predicted depth map 350 and predicted semantic labels 360, while the pose encoder uses the pair of monocular images from the training data 240 to generate a rigid-body transformation 370.

Accordingly, using the predicted depth map 350 and the transform 370, the network module 220 reconstructs the original target image and uses equation (4) to generate the self-supervised loss. As noted in relation to equation (2), the network module 220 may also generate a pseudo-label loss as part of the real loss that is combined with the self-supervised loss. Turning to FIG. 4, a process 400 illustrates how the network module 220 uses the multi-task network 250 to generate the virtual loss. For example, as shown, the image encoder 310 accepts the training data 240 in the form of virtual data (i.e., a virtual image). The image encoder 310 processes a virtual monocular image from the training data 240 and provides corresponding features to the decoders 320 and 330, which provide a predicted depth map 410 and predicted semantic labels 420. The predicted outputs 410 and 420 then serve as the basis for determining the virtual losses 430, which may further include a partial self-supervised loss 440 when the training data 240 includes temporal sequences of virtual images.

That is, the network module 220 can synthesize the target image using a transform 450 that the pose encoder 340 generates from the virtual image of a corresponding pair of virtual images when provided as part of the training data 240. Otherwise, the network module 220 may rely on other virtual data for supervision, such as provided virtual ground-truth semantics and depth. Moreover, as also shown, the network module 220 can derive the surface normal from a ground truth depth map and the predicted depth map 410 as a source of smoothing to maintain local consistency. In any case, the network module 220 can combine the virtual loss from the process 400 and the real loss from the process 300 into a mixed loss to provide a value by which at least the image encoder 310 can be updated. It should be appreciated that the mixed loss may also be applied to the pose encoder 340 and/or further elements. In any case, various elements of the multi-task network 250 may also be pre-trained to an initial state from which point the mixed-batch training is undertaken. As a still further point, the processes 300 and 400 are undertaken by the network module 220 for a multiplicity of iterations to perform the training.

Figure 5:
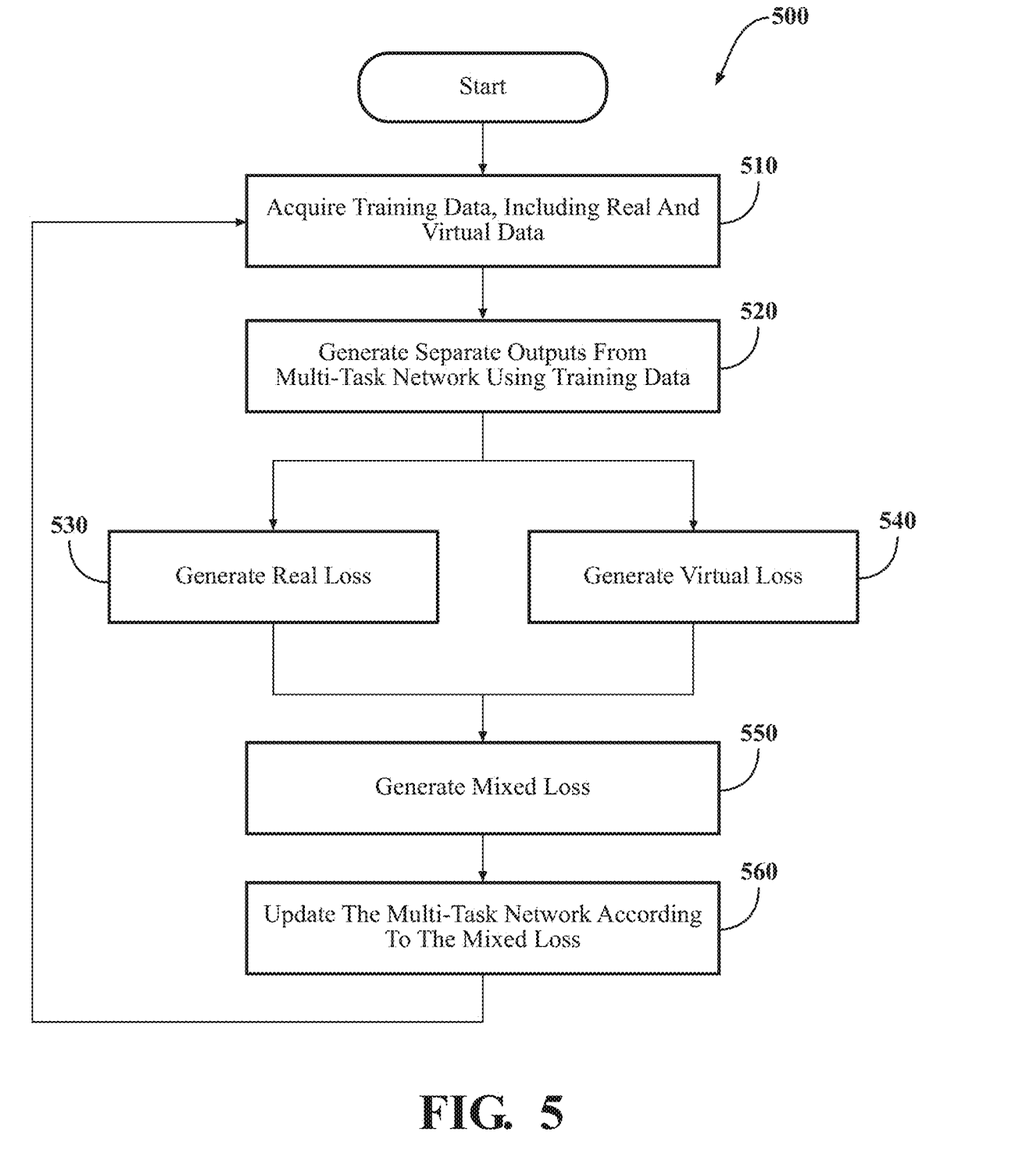
FIG. 5 illustrates a flowchart of one embodiment of a method associated with mixed-batch training of a multi-task network.

Additional aspects of the mixed-batch learning of depth prediction and semantics will be discussed in relation to FIG. 5. FIG. 5 illustrates a flowchart of a method 500 that is associated with mixed-batch training of a multi-task network. Method 500 will be discussed from the perspective of the perception system 170 of FIGS. 1-2. While method 500 is discussed in combination with the perception system 170, it should be appreciated that the method 500 is not limited to being implemented within the perception system 170 but is instead one example of a system that may implement the method 500.

At 510, the network module 220 acquires the training data 240. In general, the training data 240 is comprised of virtual data and real data. As previously explained, the virtual data can include synthetic images, ground-truth depth maps and semantic maps, pose information, and so on. The real data generally includes pairs of real monocular images derived from a camera while the camera is in motion through an environment. The network module 220 can acquire this information from a data repository or may generate the training data 240 directly. For example, in one configuration, the network module 220 may implement an image modeler for generating three-dimensional environments from which the virtual data is derived. In any case, whether the network module 220 generates the training data 240 directly or receives the training data 240 from a secondary source, the training data 240 includes both virtual and real data in order to support the mixed-batch training of at least depth prediction and semantic labeling (also referred to as semantic segmentation).

At 520, the network module 220 generates a first output from the multi-task network 250 using the real data and a second output from the multi-task network 250 using the virtual data. Thus, the network module 220 executes the multi-task network 250 separately over the real and virtual data to generate separate outputs from which the separate loss values can be derived. This provides for improving the overall training in the target domain while still enabling the use of virtual data.

At 530, the network module 220 analyzes the first output to produce the real loss. As noted above in relation to equation (2) the real loss generally includes a self-supervised loss that entails using a pair of monocular images that are part of the real data. Thus, at 530, the network module 220 reconstructs the target image using the output from processing the real data at 520. Moreover, as noted in relation to equation (2), the real loss may further include pseudo-labels as shown in relation to equation (9) that can be adjusted according the weighting coefficient to have a greater or lesser impact on the real loss overall.

At 540, the network module 220 analyzes the second output to produce the virtual loss. While the virtual loss can vary in the element that the network module 220 may generate, in at least one arrangement, the network module generates the virtual loss to include a semantic loss, a depth loss, a surface normal loss, and a synthesis loss that are supervised losses based on ground-truth data from the training data 240. Accordingly, the network module 220 analyzes the second output in relation to the ground-truth data to derive the virtual losses as supervised losses. For example, the network module 220 produces the semantic loss by applying a cross-entropy loss between ground truth semantic labels and a semantic map of the second output. Furthermore, the network module 220 produces the depth loss by applying a scale-invariant logarithmic loss (SILog) between a depth map of the second output and a ground-truth depth map from the training data 240. Additionally, the network module 220 produces the surface normal loss using a similarity metric for surface normals derived from the second output and a ground-truth normal from the training data 240 (e.g., derived from the ground-truth depth map) and produces the synthesis loss by applying a partially supervised photometric loss to the second output.

At 550, the network module 220 generates a mixed loss 260 by analyzing the first output to produce a real loss and the second output to produce a virtual loss that is then combined to form the mixed loss 260. In at least one approach, the network module 220 combines the two losses according to a weighted coefficient in order to permit the network module 220 to adjust the relative contribution of the elements to the mixed loss 260. In this way, the perception system 170 provides for training the multi-task network in a target main and on multiple tasks using virtual data for both tasks while training in the real domain on a single task.

At 560, the network module 220 updates the multi-task network 250 using the mixed loss 260 to train the multi-task network 250 for an iteration of training. It should be appreciated that the network module 220 performs the training over many iterations to fully train the multi-task network 250. Thus, as shown in FIG. 5, the process of training loops back to the beginning of method 500 to start another iteration with different data from the batch of training data 240.

Furthermore, the network module 220 provides the depth map and/or the semantic labels/map objects represented in the monocular image. In one arrangement, the network module 220 provides the information when processing data other than the training data 240 (e.g., when processing a stream of real-time data from the camera 126) to control a device (e.g., the vehicle 100) to navigate through a surrounding environment. As should be appreciated, in one arrangement, the network module 220 electronically provides information derived by the multi-task network 250 to other systems of the vehicle 100 in support of, for example, autonomous planning and navigation of the vehicle 100. Of course, in further implementations, the network module 220 communicates the derived information to a remote device that originally provides the input data as a response to an original request for information, such as semantics and depth. In general, the perception system 170 and the multi-task network 250 can be employed in various contexts in support of active autonomous navigation, scene analysis, metadata analysis (e.g., traffic analysis), and so on. In either case, the approach embodied within the perception system 170 provides a unique and improved approach to leveraging monocular images to resolve high-resolution dense depth data that is metrically accurate while also providing semantic data.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such a case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element, or arrangement or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system, or a geolocation system.

The processor(s) 110, the perception system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the perception system 170, and/or the autonomous driving module(s) 160 may control some or all of these vehicle systems 140 and, thus, may be partially or fully autonomous.

The processor(s) 110, the perception system 170, and/or the autonomous driving module(s) 160 can be operatively connected to communicate with the various vehicle systems 140 and/or individual components thereof. For example, returning to FIG. 1, the processor(s) 110, the perception system 170, and/or the autonomous driving module(s) 160 can be in communication to send and/or receive information from the various vehicle systems 140 to control the movement, speed, maneuvering, heading, direction, etc. of the vehicle 100. The processor(s) 110, the perception system 170, and/or the autonomous driving module(s) 160 may control some or all of these vehicle systems 140.

The processor(s) 110, the perception system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the perception system 170, and/or the autonomous driving module(s) 160 can control the direction and/or speed of the vehicle 100. The processor(s) 110, the perception system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the perception system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the Figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . ." as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A perception system, comprising:
one or more processors; and
a memory communicably coupled to the one or more processors and storing:
a network module including instructions that, when executed by the one or more processors, cause the one or more processors to:
acquire training data that includes real data and virtual data for training a multi-task network that performs at least depth prediction and semantic segmentation, the virtual data including synthetic images;
generate a first output from the multi-task network using the real data and second output from the multi-task network using the virtual data over separate executions of the multi-task network;
generate a mixed loss by analyzing the first output to produce a real loss that includes at least a self-supervised loss and the second output to produce a virtual loss that includes a supervised loss comprised of a semantic loss, a depth loss, a surface normal loss, and a synthesis loss; and update the multi-task network using the mixed loss.

2. The perception system of claim 1, wherein the network module includes instructions to analyze the first output to produce the real loss including instructions to generate the real loss as the self-supervised loss using a pair of monocular images that are part of the real data.

3. The perception system of claim 1, wherein the network module includes instructions to analyze the second output to produce the virtual loss including instructions to:
produce the semantic loss by applying a cross-entropy loss between ground truth semantic labels and a semantic map of the second output,
produce the depth loss by applying a scale-invariant logarithmic loss (SILog) between a depth map of the second output and a ground-truth depth map from the training data,
produce the surface normal loss by a similarity metric to surface normals derived from the second output and a ground-truth normal from the training data, and
produce the synthesis loss by applying a partially supervised photometric loss to the second output.

4. The perception system of claim 1, wherein the network module includes instructions to generate the mixed loss including instructions to combine the real loss and the virtual loss according to a weighted coefficient, and
wherein the virtual data includes ground-truth data for depth and semantics corresponding to a monocular image.

5. The perception system of claim 1, wherein the network module includes instructions to generate the first output and the second output using the multi-task network including instructions to process the training data using an image encoder of the multi-task network to generate image features and decode the image features into a semantic map using a semantic decoder and a depth map using a depth decoder of the multi-task network, and
wherein a pose encoder of the multi-task network generates a rigid-body transformation between real images in the training data.

6. The perception system of claim 1, wherein the network module includes instructions to provide a depth map and a semantic map using the multi-task network to control a device to navigate through a surrounding environment.

7. The perception system of claim 1, wherein the perception system is integrated with a vehicle that operates autonomously.

8. A non-transitory computer-readable medium including instructions that, when executed by one or more processors, cause the one or more processors to:
acquire training data that includes real data and virtual data for training a multi-task network that performs at least depth prediction and semantic segmentation, the virtual data including synthetic images;
generate a first output from the multi-task network using the real data and second output from the multi-task network using the virtual data over separate executions of the multi-task network;
generate a mixed loss by analyzing the first output to produce a real loss that includes at least a self-supervised loss and the second output to produce a virtual loss that includes a supervised loss comprised of a semantic loss, a depth loss, a surface normal loss, and a synthesis loss; and
update the multi-task network using the mixed loss.

9. The non-transitory computer-readable medium of claim 8, wherein the instructions to analyze the first output to produce the real loss include instructions to generate the real loss as the self-supervised loss using a pair of monocular images that are part of the real data.

10. The non-transitory computer-readable medium of claim 8, wherein the instructions to generate the mixed loss include instructions to combine the real loss and the virtual loss according to a weighted coefficient, and
wherein the virtual data includes ground-truth data for depth and semantics corresponding to a monocular image.

11. The non-transitory computer-readable medium of claim 8, wherein the instructions to generate the first output and the second output using the multi-task network include instructions to process the training data using an image encoder of the multi-task network to generate image features and decode the image features into a semantic map using a semantic decoder and a depth map using a depth decoder of the multi-task network, and
wherein a pose encoder of the multi-task network generates a rigid-body transformation between real images in the training data.

12. A method, comprising:
acquiring training data that includes real data and virtual data for training a multi-task network that performs at least depth prediction and semantic segmentation, the virtual data including synthetic images;
generating a first output from the multi-task network using the real data and a second output from the multi-task network using the virtual data over separate executions of the multi-task network;
generating a mixed loss by analyzing the first output to produce a real loss that includes at least a self-supervised loss and the second output to produce a virtual loss that includes a supervised loss comprised of a semantic loss, a depth loss, a surface normal loss, and a synthesis loss; and
updating the multi-task network using the mixed loss.

13. The method of claim 12, wherein analyzing the first output to produce the real loss includes generating the real loss as the self-supervised loss using a pair of monocular images that are part of the real data.

14. The method of claim 12, wherein analyzing the second output to produce the virtual loss includes:
producing the semantic loss by applying a cross-entropy loss between ground truth semantic labels and a semantic map of the second output,
producing the depth loss by applying a scale-invariant logarithmic loss (SILog) between a depth map of the second output and a ground-truth depth map from the training data,
producing the surface normal loss by a similarity metric to surface normals derived from the second output and a ground-truth normal from the training data, and
producing the synthesis loss by applying a partially supervised photometric loss to the second output.

15. The method of claim 12, wherein generating the mixed loss includes combining the real loss and the virtual loss according to a weighted coefficient, and
wherein the virtual data includes ground-truth data for depth and semantics corresponding to a monocular image.

16. The method of claim 12, wherein generating the first output and the second output using the multi-task network includes processing the training data using an image encoder of the multi-task network to generate image features and decoding the image features into a semantic map using a semantic decoder and a depth map using a depth decoder of the multi-task network, and wherein a pose encoder of the multi-task network generates a rigid-body transformation between real images in the training data.

17. The method of claim 12, further comprising:

providing a depth map and a semantic map using the multi-task network to control a device to navigate through a surrounding environment.

* * * * *